(12) United States Patent
Hill et al.

(10) Patent No.: US 7,572,748 B1
(45) Date of Patent: Aug. 11, 2009

(54) MATERIALS COMPRISING BARIUM ZIRCONATE AND METHODS FOR MANUFACTURING THEREOF

(75) Inventors: Michael D. Hill, Frederick, MD (US); David Cruickshank, Rockville, MD (US); David Cronin, Frederick, MD (US); Barry Treadway, Gaithersburg, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 203 days.

(21) Appl. No.: 11/746,861

(22) Filed: May 10, 2007

Related U.S. Application Data

(60) Provisional application No. 60/853,174, filed on Oct. 20, 2006.

(51) Int. Cl.
*C04B 35/48* (2006.01)
(52) U.S. Cl. .................. 501/135; 501/104; 423/594.12
(58) Field of Classification Search ................ 501/104, 501/135; 423/594.12
See application file for complete search history.

(56) References Cited

U.S. PATENT DOCUMENTS

| 4,975,397 | A |   | 12/1990 | Dworak et al. |
| 5,262,368 | A | * | 11/1993 | Hood et al. .................. 501/136 |
| 5,296,425 | A | * | 3/1994  | Chazono et al. ............. 501/138 |

FOREIGN PATENT DOCUMENTS

| EP | 0287841 A2 | 10/1988 |
| JP | 2002-265263 A | 9/2002 |
| WO | 92/00930 A1 | 1/1992 |

\* cited by examiner

*Primary Examiner*—Karl E Group

(57) ABSTRACT

A method for manufacturing barium zirconate particles includes providing a mixture of materials that includes barium, zirconium and a sintering aid, wherein the sintering aid includes at least one of barium tungstate, potassium niobate, tungsten oxide, barium molybdate, molybdenum oxide, potassium tantalate, potassium oxide, sodium niobate, sodium tantalate, sodium oxide, lithium niobate, lithium tantalate, lithium oxide, copper oxide, manganese oxide, zinc oxide, calcium zirconate and strontium zirconate; and heating the mixture of materials to produce barium zirconate particles that include the sintering aid.

16 Claims, 5 Drawing Sheets

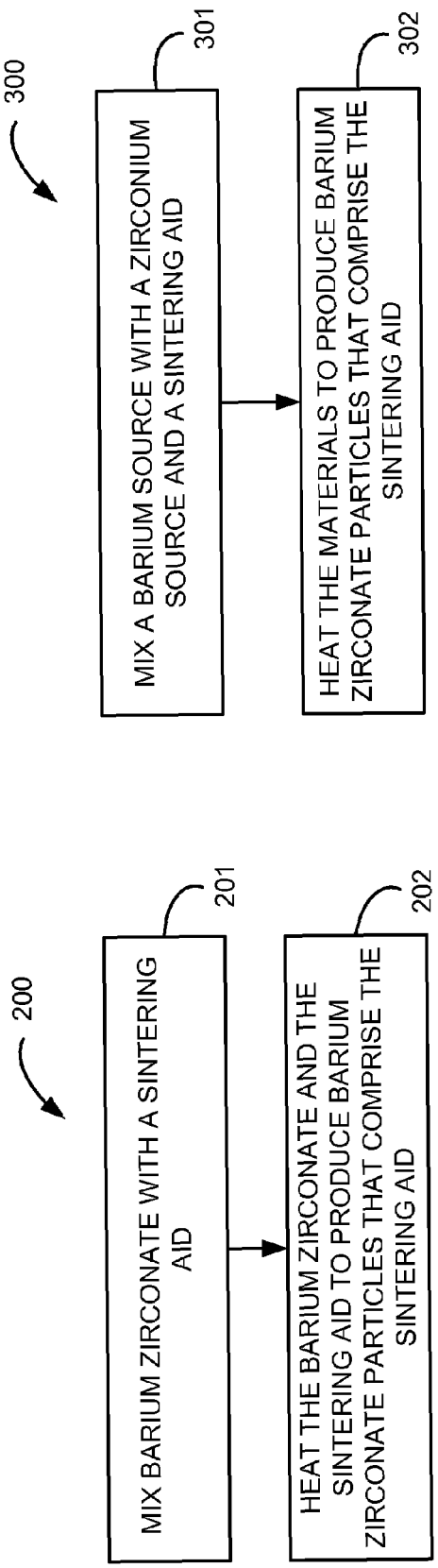
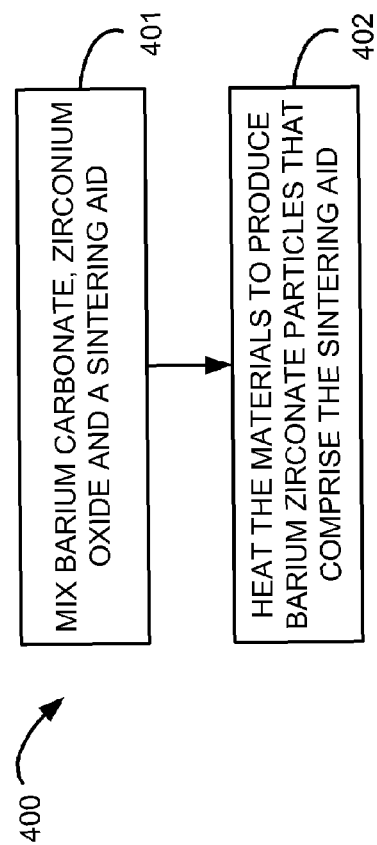

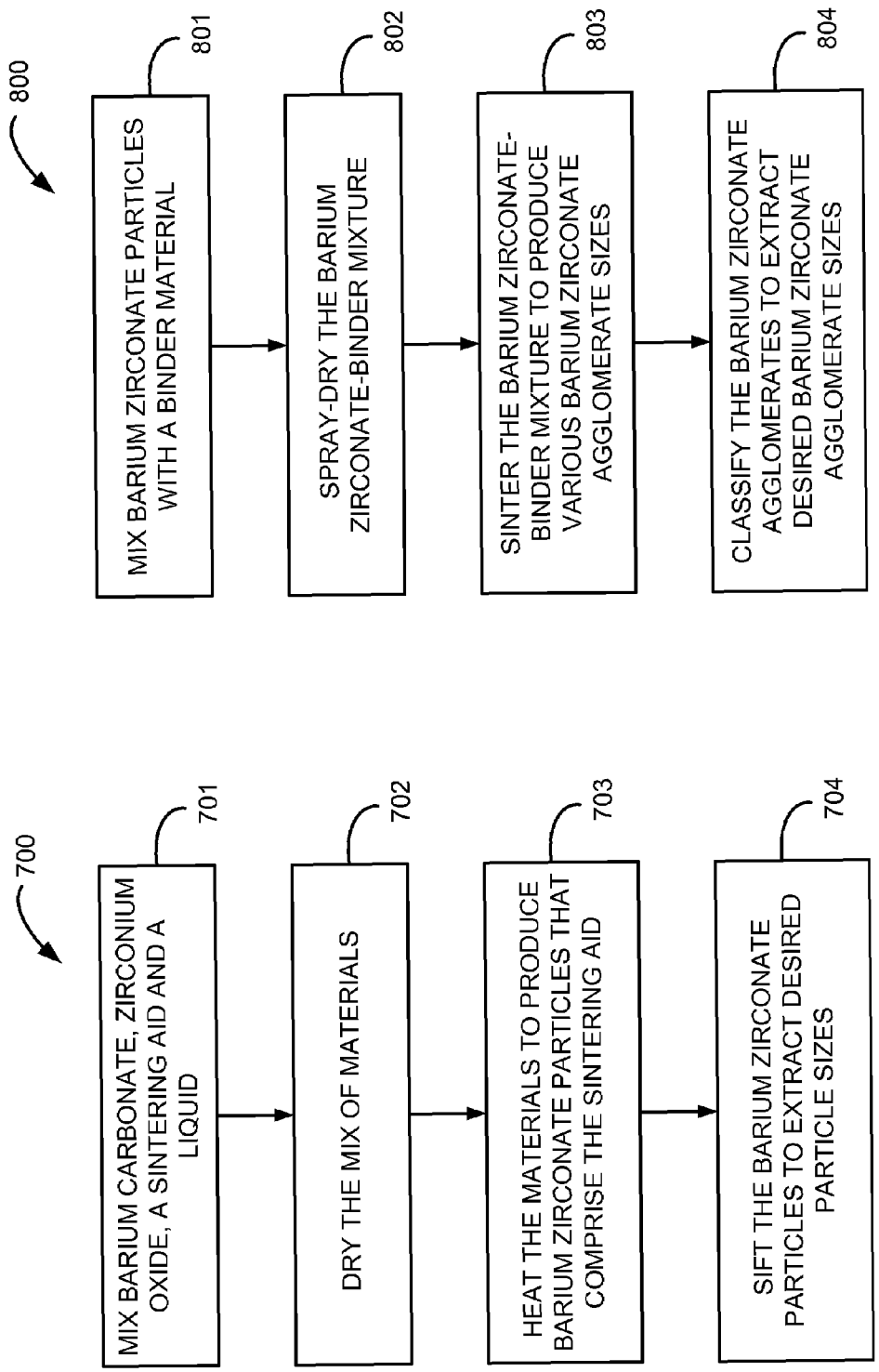

US 7,572,748 B1

MATERIALS COMPRISING BARIUM ZIRCONATE AND METHODS FOR MANUFACTURING THEREOF

CROSS REFERENCE TO RELATED APPLICATION

This application claims priority to U.S. provisional application entitled, "Ceramic Filler Material for Making Polymer-Ceramic Composites Transparent to Microwave Radiation," having Ser. No. 60/853,174, filed on Oct. 20, 2006, which is entirely incorporated herein by reference.

BACKGROUND

Radio frequency identification (RFID) technology is used in many applications to identify and determine the locations of various items. An example of RFID technology uses a passive RF device, also referred to as an RFID) chip, embedded within or otherwise associated with an item. When the RFID device comes within range of a corresponding RFID transceiver, the presence of the RFID device is detected by the RFID transceiver.

One limitation of such a system is that the RFID device may be embedded in the item, causing the material from which the item is formed to attenuate the RF signal between the RFID device and the RFID transceiver, thus limiting the range over which the REID transceiver can detect the presence of the RFID device. Therefore, it would be desirable to minimize any attenuation between the RFID device and the RFID transceiver.

SUMMARY

Materials comprising barium zirconate and methods for manufacturing such materials are disclosed. An embodiment of a method for manufacturing barium zirconate particles includes providing a mixture of materials that includes barium, zirconium and a sintering aid, wherein the sintering aid includes at least one of barium tungstate, potassium niobate, tungsten oxide, barium molybdate, molybdenum oxide, potassium tantalate, potassium oxide, sodium niobate, sodium tantalate, sodium oxide, lithium niobate, lithium tantalate, lithium oxide, copper oxide, manganese oxide, zinc oxide, calcium zirconate and strontium zirconate, and heating the mixture of materials to produce barium zirconate particles that include the sintering aid.

An embodiment of a mixture of materials for manufacturing barium zirconate particles includes barium, zirconium and at least one of barium tungstate, potassium niobate, tungsten oxide, barium molybdate, molybdenum oxide, potassium tantalate, potassium oxide, sodium niobate, sodium tantalate, sodium oxide, lithium niobate, lithium tantalate, lithium oxide, copper oxide, manganese oxide, zinc oxide, calcium zirconate and strontium zirconate.

An embodiment of barium zirconate particles includes a plurality of particles, wherein each of the plurality of particles includes barium zirconate and at least one of barium tungstate, potassium niobate, tungsten oxide, barium molybdate, molybdenum oxide, potassium tantalate, potassium oxide, sodium niobate, sodium tantalate, sodium oxide, lithium niobate, lithium tantalate, lithium oxide, copper oxide, manganese oxide, zinc oxide, calcium zirconate and strontium zirconate.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIG. 2 is a flow chart depicting an embodiment of a method for manufacturing barium zirconate particles.

FIG. 3 is a flow chart depicting an alternative embodiment of a method for manufacturing barium zirconate particles.

FIG. 4 is a flow chart depicting another alternative embodiment of a method for manufacturing barium zirconate particles.

FIG. 7 is a flow chart depicting another alternative embodiment of a method for manufacturing barium zirconate particles.

FIG. 8 is a flow chart depicting a method for manufacturing barium zirconate agglomerates.

DETAILED DESCRIPTION

Figure 1:
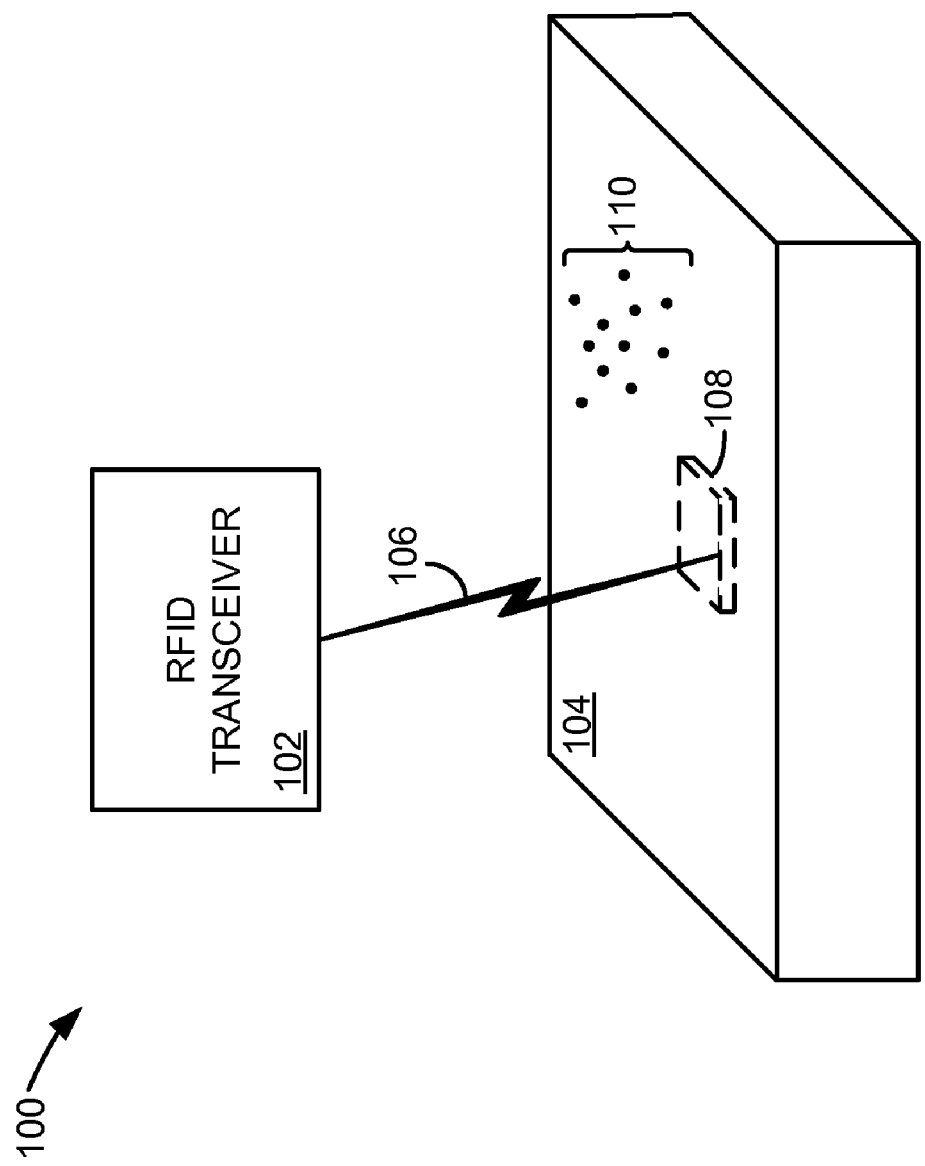
FIG. 1 is a cut away block diagram illustrating a ceramic filler material for making polymer-ceramic composites transparent to microwave radiation.

FIG. 1 is a cut away block diagram illustrating a ceramic filler material for making polymer-ceramic composites transparent to microwave radiation. A polymer-ceramic material is illustrated using reference numeral 104. The polymer-ceramic material may also be referred to as a polymer-matrix material. In an embodiment, the polymer-ceramic material comprises polyvinyl chloride (PVC), or a derivative of PVC, and a low dielectric loss ceramic oxide filler 110. Although illustrated in FIG. 1 as located in a particular region of the polymer-ceramic material 104, the low dielectric loss ceramic oxide filler 110 is typically evenly distributed within the polymer-ceramic material 104. However, the low dielectric loss ceramic oxide filler 110 may be unevenly distributed within the polymer-ceramic material 104. The low dielectric loss ceramic oxide filler 110 renders the polymer-ceramic material 104 transparent to microwave energy 106 in the wavelength range of approximately 100 megahertz (MHz) to approximately 18 gigahertz (GHz) emitted from an RFID transceiver 102. In an embodiment, the low dielectric loss ceramic oxide filler 110 permits an RFID chip 108 embedded in the polymer-ceramic material 104 to easily receive RF energy 106 with minimal attenuation and allows the RFID transceiver 102 to communicate with the REID chip 108. In an embodiment, the low dielectric loss ceramic oxide filler material 110 is fabricated using barium zirconate. However, because barium zirconate is relatively difficult to sinter, the formation of particles of barium zirconate larger than approximately 1 micrometer (μm) is a challenge. Using particles of barium zirconate larger than approximately 1 μm is desirable because the larger particle size improves the percent ceramic loading in the polymer-ceramic material 104.

To facilitate the formation of barium zirconate particles greater in size than approximately 1 μm, a material that improves the ability to sinter the barium zirconate is added. In an embodiment, at least one of barium tungstate and potassium niobate is added to the barium zirconate to improve the ability to sinter particles of barium zirconate larger than approximately 1 μm. Alternatively, one or more of tungsten oxide, barium molybdate, molybdenum oxide, potassium tantalate, potassium oxide, sodium niobate, sodium tantalate, sodium oxide, lithium niobate, lithium tantalate, lithium oxide, copper oxide, manganese oxide and zinc oxide may be added to the barium zirconate to improve the ability to sinter particles of barium zirconate larger than approximately 1 μm. Alternatively, a solid solution (i.e., a solid-state solution of one or more solutes in a solvent) of barium zirconate and at least one of calcium zirconate and strontium zirconate may be used.

FIG. 2 is a flow chart depicting an embodiment of a method 200 for manufacturing barium zirconate particles. As indicated in step 201, barium zirconate is mixed with a sintering aid. The sintering aid is a material selected, for example, from the materials listed in the following Table 1.

TABLE 1

Sintering Aids For Barium Zirconate

Barium tungstate
Potassium niobate
Tungsten oxide
Barium molybdate
Molybdenum oxide
Potassium tantalate
Potassium oxide
Sodium niobate
Sodium tantalate
Sodium oxide
Lithium niobate
Lithium tantalate
Lithium oxide
Copper oxide
Manganese oxide
Zinc oxide
Calcium zirconate
Strontium zirconate In an embodiment, the sintering aid comprises about 1%-4% of the mixture of materials by weight. The barium zirconate and the sintering aid are then heated to produce barium zirconate particles that comprise the sintering aid, as indicated in step 202. The resulting barium zirconate particles have a perovskite crystal structure. A perovskite crystal structure is one that resembles the structure of perovskite (calcium titanium oxide). The perovskite crystal structure of the barium zirconate particles enables the particles to have sizes between about 1-4 μm in diameter. Heating the materials may be performed, for example, at a temperature between about 1500° C. and 1600° C. for a period between about 8 to 12 hours.

FIG. 3 is a flow chart depicting an alternative method 300 for manufacturing barium zirconate particles. As indicated in step 301, a barium source is mixed with a zirconium source and a sintering aid. The sintering aid may be a material selected, for example, from the materials listed in Table 1, above. In an embodiment, the sintering aid comprises about 1%-4% of the mixture of materials by weight. The barium source may be, for example, barium carbonate. The zirconium source may be, for example, zirconium oxide. The mixture of materials is then heated to produce barium zirconate particles that comprise the sintering aid, as indicated in step 302. The resulting barium zirconate particles have a perovskite crystal structure and are between about 1-4 μm. Heating the materials may be performed, for example, at a temperature between about 1500° C. and 1600° C. for a period between about 8 to 12 hours.

FIG. 4 is a flow chart depicting another alternative method 400 for manufacturing barium zirconate particles. As indicated in step 401, barium carbonate is mixed with zirconium oxide and a sintering aid. The sintering aid may be a material selected, for example, from the materials listed in Table 1, above. In an embodiment, the mixture of materials includes about 59%-65% barium carbonate, about 36%-40% zirconium oxide, and about 1-4% sintering aid. The mixture of materials is then heated to produce barium zirconate particles that comprise the sintering aid, as indicated in step 402. The resulting barium zirconate particles have a perovskite crystal structure and are between about 1-4 μm. Heating the materials may be performed, for example, at a temperature between about 1500° C. and 1600° C. for a period between about 8 to 12 hours.

Figure 5:
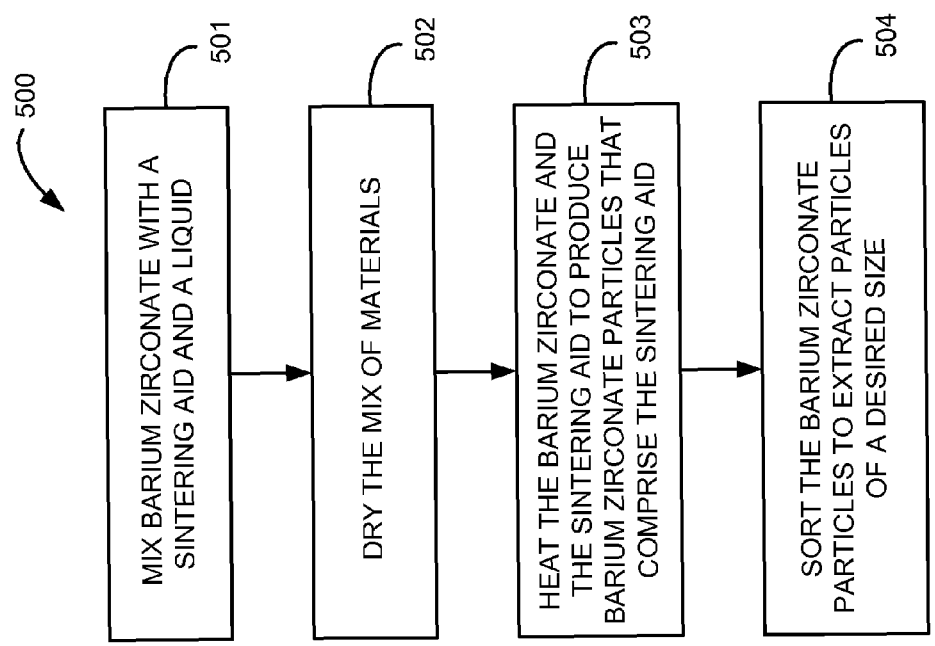
FIG. 5 is a flow chart depicting another alternative embodiment of a method for manufacturing barium zirconate particles.

FIG. 5 is a flow chart depicting another alternative method 500 for manufacturing barium zirconate particles. As indicated in step 501, barium zirconate is mixed with a sintering aid and a liquid. The sintering aid may be a material selected, for example, from the materials listed in Table 1, above. In an embodiment, the sintering aid comprises about 1%-4% of the mixture of materials by weight. The liquid may comprise, for example, water and/or alcohol. The liquid is used to enable the barium zirconate and the sintering aid to be more thoroughly mixed. The mixture of materials is then dried, as indicated in step 502. The drying may be performed by heating the mixture or by spray-drying (i.e., spraying the mixture into a heated chamber). The barium zirconate and the sintering aid are then heated to produce barium zirconate particles that comprise the sintering aid, as indicated in step 503. The resulting barium zirconate particles have a perovskite crystal structure and are between about 1-4 μm. Heating the materials may be performed, for example, at a temperature between about 15000° C. and 1600° C. for a period between about 8 to 12 hours. The barium zirconate particles are then sorted (e.g., by sifting, sieving or centrifuging) to extract desired particle sizes, as indicated in step 504. The desired particle sizes may be, for example, between about 1-4 μm.

Figure 6:
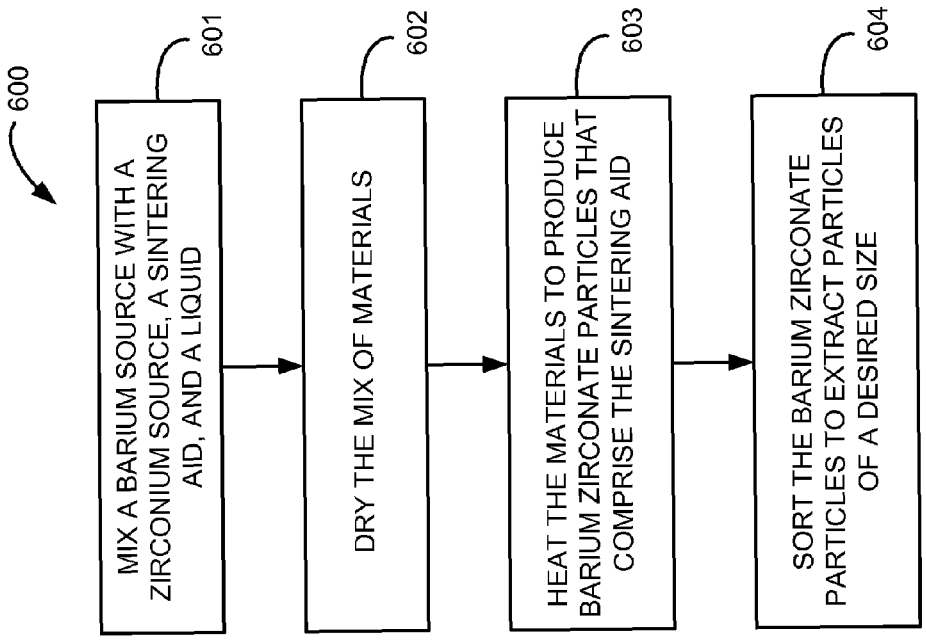
FIG. 6 is a flow chart depicting another alternative embodiment of a method for manufacturing barium zirconate particles.

FIG. 6 is a flow chart depicting another alternative method 600 for manufacturing barium zirconate particles. As indicated in step 601, a barium source is mixed with a zirconium source, a sintering aid and a liquid. The sintering aid may be a material selected, for example, from the materials listed in Table 1, above. The barium source may be, for example, barium carbonate. The zirconium source may be, for example, zirconium oxide. The liquid may comprise, for example, water and/or alcohol. The liquid is used to enable the barium source, the zirconium source and the sintering aid to be more thoroughly mixed. The mixture of materials is then dried, as indicated in step 602. The drying may be performed by heating the mixture or by spray-drying (e.g., as described above). The mixture of materials is then heated to produce barium zirconate particles that comprise the sintering aid, as indicated in step 603. The resulting barium zirconate particles have a perovskite crystal structure and are between about 1-4 μm. Heating the materials may be performed, for example, at a temperature between about 1500° C. and 1600° C. for a period between about 8 to 12 hours. The barium zirconate particles are then sorted (e.g., by sifting, sieving or centrifuging) to extract desired particle sizes, as indicated in step 604. The desired particle sizes may be, for example, between about 1-4 μm.

FIG. 7 is a flow chart depicting another alternative method 700 for manufacturing barium zirconate particles. As indicated in step 701, barium carbonate, zirconium oxide, a sintering aid and a liquid are mixed. The sintering aid may be a material selected, for example, from the materials listed in Table 1, above. The liquid may comprise, for example, water and/or alcohol. The liquid is used to enable the barium carbonate, zirconium oxide and the sintering aid to be more thoroughly mixed. In an embodiment, the mixture of materials includes about 59%-65% barium carbonate, about 36%-40% zirconium oxide, and about 1-4% sintering aid by weight. The mixture of materials is then dried, as indicated in step 702. The drying may be performed by heating the mixture or by spray-drying (e.g., as described above). The mixture of materials is then heated to produce barium zirconate particles that comprise the sintering aid, as indicated in step 703. The resulting barium zirconate particles have a perovskite crystal structure and are between about 1-4 μm. Heating the materials may be performed, for example, at a temperature between about 1500° C. and 1600° C. for a period between about 8 to 12 hours. The barium zirconate particles are then sorted (e.g., by sifting, sieving or centrifuging) to extract desired particle sizes, as indicated in step 704. The desired particle sizes may be, for example, between about 1-4 μm.

Depending on the methods and/or materials used to produce a polymer-ceramic material that is transparent to microwave energy, agglomerates of barium zirconate particles may be desired for inclusion in the polymer-ceramic material. An agglomerate is defined as a cluster. FIG. 8 is a flow chart depicting a method 800 for manufacturing such barium zirconate agglomerates. As indicated in step 801, barium zirconate particles, which include a sintering aid as described above, are mixed with a binder material. The barium zirconate particles are produced, for example, via one of the methods illustrated in FIGS. 2-7. The binder material is used to bind barium zirconate particles to form barium zirconate agglomerates. The binder material may comprise, for example, polyvinyl alcohol and/or polyethylene glycol. A solvent, such as water, may also be added to the barium zirconate-binder mixture to enable the barium zirconate and the binder material to be more thoroughly mixed.

After the barium zirconate particles are mixed with the binder material, the barium zirconate-binder mixture is then spray-dried (e.g., sprayed into a heated chamber), as indicated in step 802. The dried barium zirconate-binder mixture is then sintered to produce various barium zirconate agglomerate sizes, as indicated in step 803. The sintering of the materials may be performed, for example, at a temperature between about 1500° C. and 1600° C. for a period between about 8 to 12 hours. The sintering enables the binder to bind barium zirconate particles together to form larger agglomerates (or clusters) of barium zirconate. The barium zirconate agglomerates are then sorted (e.g., via sifting, sieving or centrifuging) to extract desired barium zirconate agglomerate sizes, as indicated in step 804. The desired barium zirconate agglomerate sizes may be, for example, between about 40-100 μm.

Depending on the methods and/or materials used to produce a polymer-ceramic material that is transparent to microwave energy, agglomerates of barium zirconate that are smaller than 40 μm may be desired for inclusion in the polymer-ceramic material.

Figure 9:
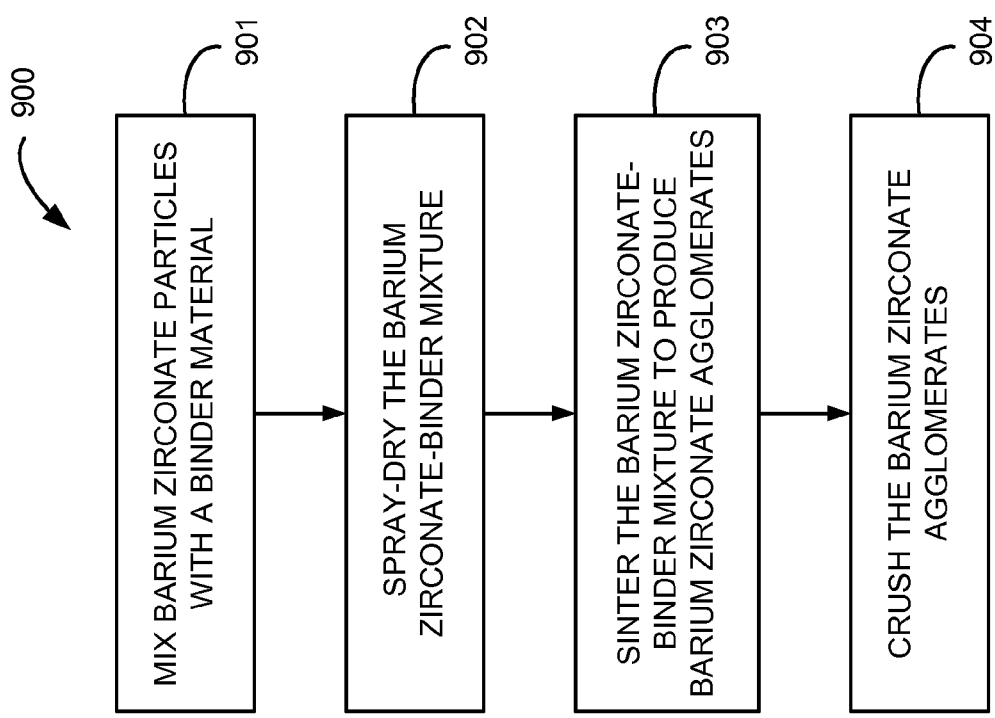
FIG. 9 is a flow chart depicting another method for manufacturing barium zirconate agglomerates.

FIG. 9 is a flow chart depicting another method 900 for manufacturing barium zirconate agglomerates. As indicated in step 901, barium zirconate particles, which include a sintering aid as described above, are mixed with a binder material. The barium zirconate particles are produced, for example, via one of the methods illustrated in FIGS. 2-7. The binder material is used to bind barium zirconate particles to form barium zirconate agglomerates. The binder material may comprise, for example, polyvinyl alcohol and/or polyethylene glycol. A solvent, such as water, may also be added to the barium zirconate-binder mixture to enable the barium zirconate and the binder material to be more thoroughly mixed.

After the barium zirconate particles are mixed with the binder material, the barium zirconate-binder mixture is then spray-dried (e.g., sprayed into a heated chamber), as indicated in step 902. The dried barium zirconate-binder mixture is then sintered to produce barium zirconate agglomerates, as indicated in step 903. The sintering of the materials may be performed, for example, at a temperature between about 1500° C. and 1600° C. for a period between about 9 and 12 hours.

The barium zirconate agglomerates are then crushed, as indicated in step 904. The crushed barium zirconate agglomerates have sizes in a range of about 10-20 μm. The crushed barium zirconate agglomerates may optionally be sorted (e.g., via sifting, sieving or centrifuging) in order to extract barium zirconate agglomerates that are in a desired size range that is a subset of the 10-20 μm range of sizes.

While various embodiments of the invention have been described, it will be apparent to those of ordinary skill in the art that many more embodiments and implementations are possible that are within the scope of this invention. Accordingly, the invention is not to be restricted except in light of the following claims and their equivalents.

What is claimed is:

1. A method comprising:
providing a mixture of materials that includes barium, zirconium and a sintering aid, wherein the sintering aid includes at least one of barium tungstate, potassium niobate, tungsten oxide, barium molybdate, molybdenum oxide, potassium tantalate, potassium oxide, sodium niobate, sodium tantalate, sodium oxide, lithium niobate, lithium tantalate, lithium oxide, copper oxide, manganese oxide, zinc oxide, calcium zirconate and strontium zirconate; and
heating the mixture of materials to produce barium zirconate particles that include the sintering aid.

2. The method of claim 1, wherein the barium and the zirconium are provided in the form of barium zirconate.

3. The method of claim 1, wherein the barium is provided in the form of barium carbonate and the zirconium is in the form of zirconium oxide.

4. The method of claim 1, wherein the barium zirconate particles include particles having sizes between about 1 μm to 4 μm.

5. The method of claim 1, wherein the mixture of materials is heated at a temperature between about 1500° C. and about 1600° C.

6. The method of claim 1, wherein the mixture of materials further includes at least one of water and alcohol.

7. The method of claim 1, further comprising drying the mixture of materials prior to the heating.

8. The method of claim 7, wherein drying the mixture of materials comprises spraying the mixture of materials into a heated chamber.

9. The method of claim 1, wherein the barium zirconate particles each comprise a perovskite crystal structure.

10. The method of claim 1, further comprising:
mixing the barium zirconate particles with a binder material; and
heating the barium zirconate particles and the binder material to produce a barium zirconate agglomerate that includes barium zirconate and the binder material.

11. The method of claim 10, wherein the binder material includes at least one of polyvinyl alcohol and polyethylene glycol.

12. The method of claim 10, further comprising sorting the barium zirconate agglomerate to extract an agglomerate having a size in a predetermined range of sizes.

13. The method of claim 12, wherein the predetermined range of sizes is one of a range between about 10 µm to 20 µm and a range between about 40 µm to 100 µm.

14. The method of claim 10, further comprising mixing the barium zirconate particles and binder material with a solvent prior to heating the barium zirconate particles and binder material.

15. The method of claim 14, further comprising crushing the barium zirconate particles and the binder material prior to heating the barium zirconate particles and binder material.

16. The method of claim 14, further comprising drying the barium zirconate particles and binder material by spraying the barium zirconate particles and binder material into a heated chamber prior to heating the barium zirconate particles and binder material.

* * * * *